350-377 SR
XR 3,625,617 030W WP

United Stat

[11] 3,625,617

[72] Inventor Di Chen
Minnetonka, Minn.
[21] Appl. No. 55,045
[22] Filed July 15, 1970
[45] Patented Dec. 7, 1971
[73] Assignee Honeywell Inc.
Minneapolis, Minn.

[54] KERR EFFECT READ-OUT SYSTEM FOR AN OPTICAL MEMORY
7 Claims, 4 Drawing Figs.

[52] U.S. Cl. .......... 356/118, 250/225, 340/174.1 MO, 350/151, 356/114
[51] Int. Cl. .......... G01n 21/44, G11b 11/10
[50] Field of Search .......... 356/118, 114, 117; 350/151; 340/174.1 MO; 346/74 MT; 250/225

[56] References Cited
UNITED STATES PATENTS

| | | | |
|---|---|---|---|
| 3,401,590 | 9/1968 | Massey | 356/114 |
| 3,284,785 | 11/1966 | Kornei | 340/174.1 (MO) |

FOREIGN PATENTS

| | | | |
|---|---|---|---|
| 1,192,743 | 5/1965 | Germany | 356/114 |

OTHER REFERENCES

D. Chen, et al., J. Appl. Phys. Vol. 36, #3 3/65 pp. 1261–1263.
H. J. Williams, et al., J. Appl. Phys. Vol. 28, #10, 10/57 pp. 1181–1184

*Primary Examiner*—Ronald L. Wibert
*Assistant Examiner*—J. Rothenberg
*Attorneys*—Lamont B. Koontz and Omund R. Dahle

ABSTRACT: The magnetic state of a material exhibiting the Kerr effect is monitored by a system which directs a polarized light beam normal to the surface of the material and which includes a polarization sensitive element capable of directing light over two different paths depending on the polarization of the light and a polarization shifter located between the polarization sensitive element and the magnetic material.

3625617
OR IN 356/369

INVENTOR.
DI CHEN
BY Omund R. Dahle
ATTORNEY.

INVENTOR.
DI CHEN
BY Omund R. Dahle
ATTORNEY.

KERR EFFECT READ-OUT SYSTEM FOR AN OPTICAL MEMORY

BACKGROUND OF THE INVENTION

Magnetic materials which have two stable magnetic states and which exhibit Kerr rotations for these states which are equal in magnitude but opposite in sign can be used as a memory medium for a magneto-optic memory. Some magnetic materials have a preferred magnetization direction which is parallel to the surface of the material and therefore exhibit a longitudinal or transverse magneto-optic Kerr effect. One such material is permalloy film. Other materials such as manganese bismuth film and the orthoferrites have a preferred magnetization direction which is normal to the surface of the material, and therefore these materials exhibit a polar magneto-optic effect.

In an optical memory using a magnetic material, information can be stored by the use of Curie point writing and can be read out by monitoring either the Farady or the Kerr rotation. In such an optical memory system, it is desirable to monitor the Kerr rotation with an incident beam which is essentially normal to the surface of the magnetic material, since only one set of light positioning and focusing means is then required. Since the materials necessary to provide a light positioning apparatus are quite expensive, a reduction of one-half in the amount of optics required is highly desirable. A reduction in the amount of optics required is highly desirable. A reduction in the amount of optics also allows for a corresponding reduction in the size of an optical memory system. In addition, it has been shown that for magnetic materials exhibiting a polar magneto-optic effect, maximum rotation is obtained when the incident light beam is normal to the surface of the material.

Prior art optical readout systems FIG. 1 which monitor the Kerr rotation with an incident beam 10 essentially normal to the surface of the magnetic medium 11 make use of a semitransparent or beam splitter mirror 12 placed between the light source 13 and the focusing and light positioning means 14 with the reflecting surfaces inclined to the direction of the beam. An analyzer 15 which passes a higher intensity of light for one direction of rotation than for the opposite direction of rotation is located between the beam splitter and the detector 16. Since the beam splitter mirror 12 partially reflects and partially transmits light, it results in a reduction in the intensity of the light which reaches the detector. If the beam splitter 12 reflects one-half of the incident light beam, the maximum intensity of the beam reaching the detector 16 is one-fourth of the intensity of the light supplied by the polarized light source 13.

SUMMARY OF THE INVENTION

In the present invention a polarization sensitive element, which directs light over two different paths depending upon the polarization of the light, replaces the semitransparent mirror used in the prior art. Such polarization sensitive element can be a polarizing beam splitter such as a Glan, Glan-Thomson, or Nicol polarizer with an exit window on the side, or a Rochon or Wallaston prism. The polarization sensitive element is oriented so as to pass light which is polarized in the direction of the polarization of the incident beam, and therefore the beam passes unattenuated to the magnetic medium, where it is rotated and reflected back to the polarization sensitive element. The component of the reflected beam which is polarized in the direction of polarization of the incident beam passes through the element and back to the source while the Kerr component of the light is directed to the detector. The Kerr rotation for positive and negative magnetization of the medium is $+\theta_k$ and $-\theta_k$ respectively, and therefore if $I_m$ is the electric field amplitude of the reflected light, the amplitude of the light reaching the detector is $I_m \text{Sin}\theta_k$ for positive magnetization and $I_m \text{Sin}(-\theta_k)$ for negative magnetization. The detector measures the intensity of the light which it receives, which is the square of the amplitude of the light and therefore the detector can differentiate between zero magnetization, which creates no rotation of polarization and Kerr component, and a region of nonzero magnetization having a nonzero Kerr component. However, since $\text{Sin}^2\theta_k = \text{Sin}^2(-\theta_k)$, the detector is unable to differentiate between a region of positive magnetization and one of negative magnetization, and therefore the replacement of the mirror beam splitter by a polarization sensitive means does not by itself enhance the optical readout system, but in fact makes it inoperable.

The present invention further includes a polarization shifter such as a Faraday cell which is placed in the path of the beam between the polarization sensitive element and the magnetic medium. The polarization shifter provides an additional rotation each time the beam passes through it so that the Kerr component will differ in magnitude, thereby allowing the detector to distinguish between positive and negative magnetization of the medium.

DESCRIPTION OF THE PREFERRED EMBODIMENTS

Figure 1:
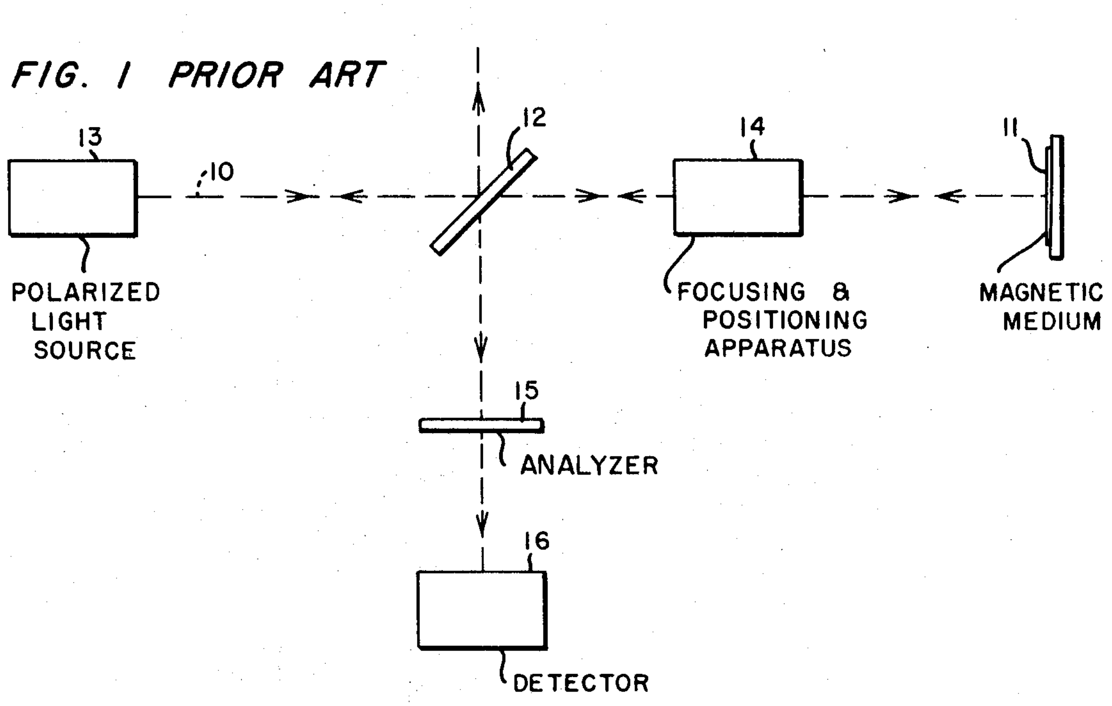
FIG. 1 PRIOR ART
FIG. 1 is a schematic drawing of a prior art optical readout system employing a beam splitter mirror.
Figure 2:
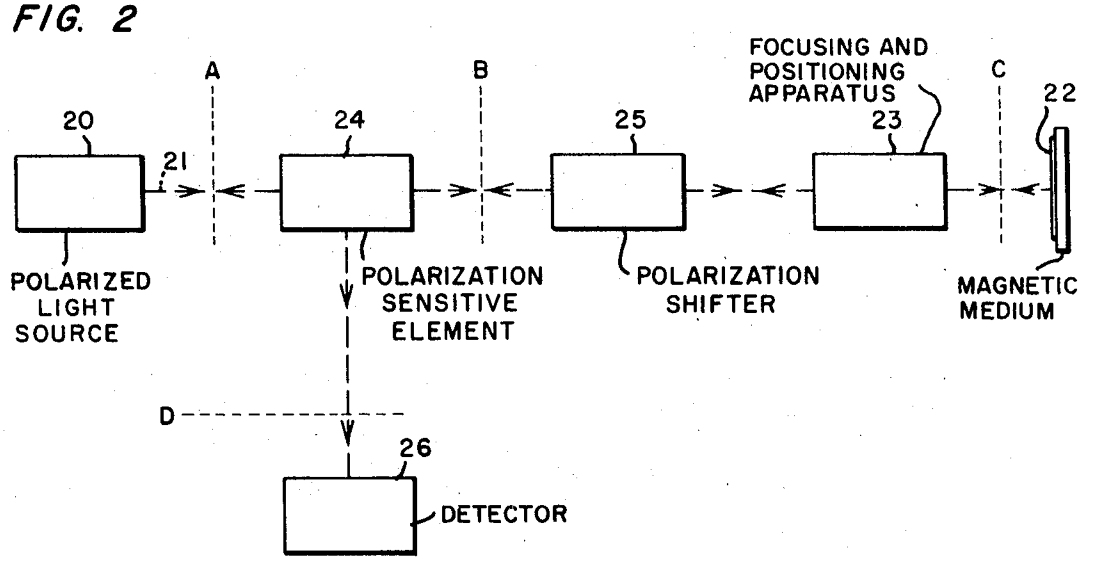
FIG. 2 is a schematic drawing of the preferred embodiment of the present invention.

Referring to FIG. 2, a polarized light source 20 provides light beam 21 which is directed essentially normal to the surface of the magnetic medium 22. Focusing and light positioning means 23 make it possible to address various regions of the magnetic memory medium 22 with the light beam 21. A polarization sensitive element 24 is located in the path of the light beam 21 between the source 20 and the light positioning and focusing means 23. The polarization sensitive element 24 is oriented so that light having a polarization direction the same as that of the incident beam travels over one path while light polarized in another direction is directed over a second path. A polarization shifter 25, such as a Faraday cell, is located between the polarization sensitive element 24 and the focusing and deflection system 23. A light detector 26 is positioned to receive the Kerr component of the reflected light.

Since the polarization sensitive element 24 is oriented to transmit the component of light polarized in the direction of the polarization of the incident beam, the incident beam passes unattenuated to the surface of the magnetic medium 22. Upon reflection, the beam returns to the polarization sensitive element 24, where the entire Kerr component is directed to the detector. It can be seen that the detector in the present invention receives four times the amount of power of that of the prior art system.

In order for the detector to be able to differentiate between the region of positive magnetization and one of negative magnetization, it is necessary to provide a polarization shifter between the polarization sensitive element and the focusing and deflection means. The polarization shifter, which could comprise a Faraday cell, provides an additional rotation $\theta_0$ with each passage of the beam through the shifter. The polarization direction of the reflected beam is therefore biased by $2\theta_0$ so that the total rotation for positive magnetization of the medium is $2\theta_0+\theta_k$ and the total rotation for negative magnetization of the medium is $2\theta_0-\theta_k$. The components of light reflected by the polarization sensitive element are $I_m \text{Sin}(2\theta_0+\theta_k)$ and $I_m \text{Sin}(2\theta_0-\theta_k)$ respectively, and therefore the detector is able to distinguish between positive and negative magnetization of the medium. If $\theta_0=\theta_k/2$, there is no signal at the detector for a beam reflected from negative magnetization regions and a maximum signal for a positive magnetization region. However, it is not necessary to make $\theta_0=\theta_k/2$ if a certain amount of background signal or intensity can be tolerated. In this case, $\theta_0$ should be greater than $\theta_k/2$ .

Figure 3:
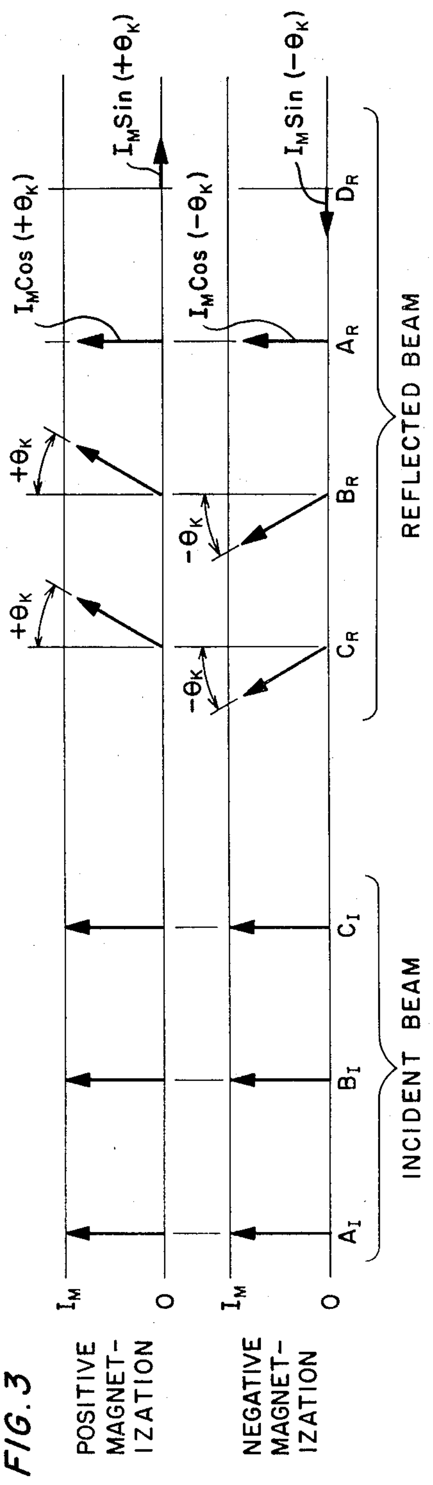
FIG. 3 is a diagram of the polarization vectors of the incident and reflected beams at various positions in an optical readout system employing a polarization sensitive element but no polarization shifter.
Figure 4:
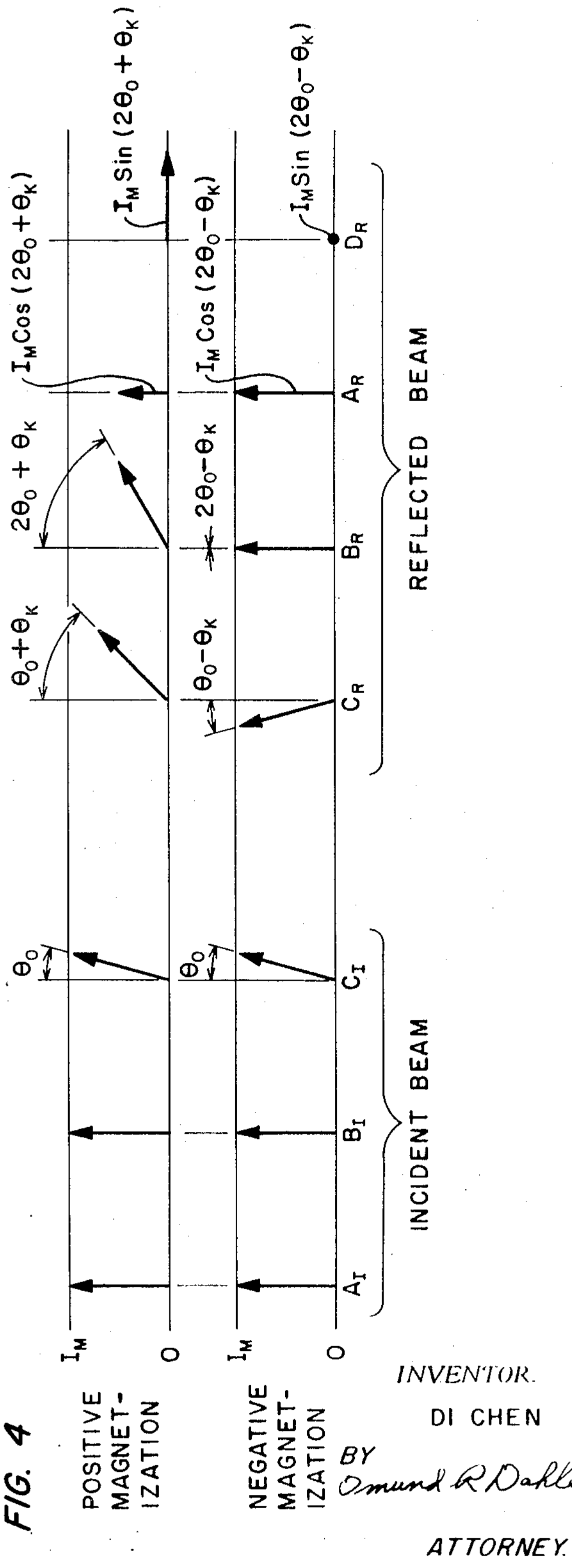
FIG. 4 is a diagram of the polarization vectors of the incident and reflected beams at various positions in an optical readout system employing a polarization sensitive element and a polarization shifter.

The necessity of polarization shifter 25 is illustrated by the diagrams of FIGS. 3 and 4. FIG. 3 shows the polarization vectors of the incident and reflect beam at various positions when $\theta_0=0°$, or in other words, when no polarization shifter is present in a system using a polarization sensitive element 24. It can be seen the entire incident beam passes unattenuated through the polarization sensitive element 24 to the magnetic medium 22. The polarization vector is rotated by $+\theta_k$ or $-\theta_k$ depending upon the magnetization of the magnetic medium. Upon reaching the polarization sensitive element 24, the beam is split, with that component $I_m$Cos $(+\theta_k)$ or $I_m$Cos $(-\theta_k)$ having a polarization the same as the incident vector being directed back toward the light source 20 over path A. The Kerr component $I_m$Sin $(+\theta_k)$ or $I_m$Sin $(-\theta_k)$ is directed over path D. It can be seen that while the polarization vector at D differs in sign, it has the same magnitude for both positive and negative magnetization. Since the detector measures intensity of light, which is the square of the amplitude of the light, the detector is unable to distinguish between positive and negative magnetization when no polarization shifter 25 is used.

FIG. 4 illustrates the polarization vectors of the incident and reflected beams when a polarization shifter is used. In order to obtain maximum contrast between positive and negative magnetization, the polarization shifter 25 provides an additional rotation $\theta_0=\theta_k/2$. As in FIG. 3, the incident beam ($A_I$) passes through the polarization sensitive element unattenuated ($B_I$). Passage through the polarization shifter causes a rotation of the vector $\theta_o$ ($C_I$). The vector is then further rotated by $+\theta_k$ or $-\theta_k$ by the magnetic medium 22 ($C_R$). The reflected beam passes through polarization shifter 25 and is rotated by an additional $\theta_o$ ($B_R$). Since $\theta_o=\theta_k/2$, the resultant shift in polarization for negative magnetization is zero, the Kerr component ($D_R$) is zero, and the entire beam ($A_R$) passes through the polarization sensitive element 24 toward the light source 20. The Kerr component ($D_R$) for positive magnetization is nonzero, and therefore the detector 26 is able to determine the magnetization of the magnetic medium.

In one system utilizing manganese bismuth film having a $\theta_k=2°$, a glass rod two inches long made of optical quality glass such as BK7 is used as the polarization shifter supplying a bias of 1° rotation when a 600 Gauss field is applied. The polarization sensitive element is a Glan polarizer with an exit window on the side. A laser provides the light source, allowing the system to be used for Curie point writing as well as optical readout.

It is to be understood that this invention has been disclosed with reference to a preferred embodiment, and it is possible to make changes in form and detail without departing from the spirit and scope of this invention.

What is claimed is:

1. A system for detecting, by the magneto-optic Kerr effect, the state of a magneto-optic material having two stable states, where the magneto-optic Kerr rotations for the two stable states are equal in magnitude but opposite in sign, the system comprising:
   - a light beam source for projecting along a path polarized light beam having a first polarization direction,
   - the magneto-optic material positioned to receive the light beam at essentially normal incidence and to rotate the polarization direction of the light beam and reflect the light beam back toward the light beam source over essentially the same path,
   - a polarization sensitive element located between the light beam source and the magneto-optic material, the polarization sensitive element being oriented to pass essentially unattenuated the light beam projected toward the magneto-optic material, to direct over a first path a component of the light beam reflected from the magneto-optic material which has the first polarization direction, and to direct over a second path a component of the light beam having a polarization direction different from the first polarization direction,
   - light detector means positioned to receive the component directed over the second path,
   - polarization shifter means for rotating the direction of polarization of the light beam by an angle sufficient to cause the component of the light beam received by the detector means to have a first amplitude if the magneto-optic material is in one of the two stable states and a second different amplitude if the magneto-optic material is in the other of the two stable states, said polarization shifter means located between the polarization sensitive element and the magneto-optic material, and
   - focusing and light positioning means located between the polarization shifter means and the magneto-optic material.

2. The system of claim 1 wherein the polarization sensitive element is a polarizing beam splitter.

3. The system of claim 1 wherein the magneto-optic material is a ferromagnetic medium.

4. The system of claim 3 wherein the ferromagnetic medium has a preferred magnetization direction normal to the surface of the material.

5. The system of claim 4 wherein the ferromagnetic medium is manganese bismuth film.

6. The system of claim 1 wherein the means for rotating the polarization of the light beam is a Faraday cell.

7. The system of claim 1 wherein the rotation of the polarization for a single passage through the means for rotating the polarization is essentially equal to one-half the Kerr rotation of the magneto-optic material.

* * * * *